United States Patent

Swygert, Jr.

[15] 3,691,404

[45] Sept. 12, 1972

[54] VARIABLE DUTY CYCLE CONTROL CIRCUIT

[72] Inventor: Wilbert E. Swygert, Jr., Charlottesville, Va.

[73] Assignee: Sperry Rand Corporation

[22] Filed: Sept. 1, 1971

[21] Appl. No.: 176,923

[52] U.S. Cl. ....307/252 W, 307/252 Q, 307/252 UA, 307/269, 315/292, 321/16, 323/22 SC

[51] Int. Cl. ......H02m 1/08, H02m 5/16, H03k 17/28

[58] Field of Search ..307/239, 240, 252 UA, 252 W, 307/284, 296, 305; 313/108 R; 315/194, 199, 291, 292; 318/599; 321/16; 323/22 SC, 24; 328/21, 84, 210, 250

[56] References Cited

UNITED STATES PATENTS

| | | | |
|---|---|---|---|
| 3,307,094 | 2/1967 | Ogle | 323/22 SC X |
| 3,452,214 | 6/1969 | Martin | 323/22 SC X |
| 3,480,909 | 11/1969 | Hines | 307/284 X |
| 3,491,283 | 1/1970 | Johnston | 321/16 |
| 3,504,204 | 3/1970 | Carrive | 307/252 UA X |
| 3,562,625 | 2/1971 | Broek | 323/22 SC X |
| 3,590,346 | 6/1971 | Bilo | 307/305 X |

*Primary Examiner*—Donald D. Forrer
*Assistant Examiner*—L. N. Anagnos
*Attorney*—S. C. Yeaton

[57] ABSTRACT

A control circuit includes counter and decode logic which divides down a basic clock frequency signal to provide control signals at specified pulse repetition rates and selectable duty cycles which are coupled through a selector switch and applied to a trigger generator circuit. An alternating signal to be controlled having a frequency equal to the frequency of the basic clock signal and being phase-locked thereto is applied to a full wave rectifier which is coupled to the trigger generator circuit. The control signals gate the trigger generator circuit into conduction to produce trigger pulses from the rectifier output signals. The alternating signal is simultaneously coupled through a transmission gate circuit which is gated into conduction by the application of the trigger pulses to SCRs within the transmission gate circuit. The duty cycle of the alternating output signal produced by the transmission gate circuit is proportional to the duty cycle of the selected control signal. Generation of the trigger pulses occurs substantially at the zero-crossovers of the alternating signal thereby eliminating the electro-magnetic interference coupled into the alternating output signal from the transmission gate circuit.

12 Claims, 2 Drawing Figures

INVENTOR
WILBERT E. SWYGERT JR.
BY
HP Terry
ATTORNEY

INVENTOR
WILBERT E. SWYGERT JR.
BY
HP Terry
ATTORNEY

VARIABLE DUTY CYCLE CONTROL CIRCUIT

BACKGROUND OF THE INVENTION

1. Field of the Invention

The present invention relates to the art of control circuits and particularly to those employing SCRs for controlling the duty cycle of an alternating signal in applications where generated electromagnetic interference must be held to a minimum.

2. Description of the Prior Art

In the prior art, circuits are known for controlling the duty cycle, i.e., the ratio of ON-OFF time of an alternating signal. The majority of these circuits employ relaxation devices to control a sweep signal. The abrupt change due to discharge of a relaxation device terminates the sweep signal which in turn controls a switch that either turns-on or turns-off the alternating signal. One configuration known in the prior art employs the series combination of a triac and a load in which an alternating signal is applied to the combination. The output terminal of an operational amplifier is connected to the gate terminal of the triac while one input of the operational amplifier is coupled to the output of a ramp generator and the other input terminal is coupled to a reference voltage. The operational amplifier provides an output signal that gates the triac into conduction thereby allowing the alternating signal to conduct through the triac and the load. When the output voltage of the ramp generator exceeds the instantaneous value of the reference voltage the output signal of the operational amplifier is removed from the gate terminal of the triac thereby causing the triac to cease conduction. As a result the alternating current signal is removed from the load for the remainder of that particular sweep interval. Recycling the sweep generator drops the output sweep voltage below the reference voltage and the operational amplifier produces an output signal which gates the triac into conduction thereby reapplying the alternating signal to the load.

In many lamp dimmer applications where duty cycle control of an alternating signal is employed it is desirable to limit electromagnetic interference during switching of the control device. Rather than use filters to reduce the electromagnetic interference, a zero-point switching technique is employed. Zero-point switching is a technique in which the control element (triac, SCR etc.) is gated on at the instant the alternating signal passes through zero voltage.

In duty cycle control circuits which include triacs as the switching element, the switching point must be at the zero level voltage in order to be effective. A triac that is turned on with a small voltage across it into a load of a few hundred watts will result in sufficient electromagnetic interference to nullify the advantages of the zero-point switching technique. The gate circuit of the present invention includes SCRs which are switched at substantially the zero voltage point without nullifying the advantages of the zero-point switching technique.

SUMMARY OF THE INVENTION

The present invention is a control circuit which varies the duty cycle of an input alternating signal that is applied to a full-wave diode bridge circuit which includes a first SCR gated on through a second SCR controlled by trigger pulses. The trigger pulses are derived from the input alternating signal which is full-wave rectified and applied to a trigger generator circuit comprised of a transistorized switch and differentiator circuit. The trigger generator circuit is gated on by a control voltage from a selector switch which couples one of a plurality of outputs from a counter and decode logic into the trigger generator circuit. The counter and decode logic produces a plurality of signals having specified pulse repetition rates and selectable duty cycles from a clock frequency input signal that is identical in frequency. Further, the plurality of signals are phase-locked to the input alternating signal.

Each positive half-cycle of the control signal gates the transistorized switch for a period of time equal to the length of the positive half-cycle. During this time rectified half-cycles of the alternating signal are coupled through the transistorized switch and applied to the differentiator circuit which is comprised of a coupling capacitor and the primary of a transformer. Since the slope of the full-wave rectified alternating signal undergoes a change from maximum negative to maximum positive at the zero voltage points, sharp positive going edges are generated by the differentiating circuit at these points in time. The positive going edges are coupled into the secondary of the transformer and applied to the gate terminal of the second SCR which is gated on and, in turn, gates on the first SCR which is connected across the rectifying terminals of the full wave diode bridge circuit. Gating on the first SCR couples the input alternating signal to the primary of an output transformer. An alternating output signal having a controlled duty cycle proportional to the duty cycle of the selected control signal is produced at the output terminals on the secondary of the output transformer.

DESCRIPTION OF THE PREFERRED EMBODIMENT

Figure 1:
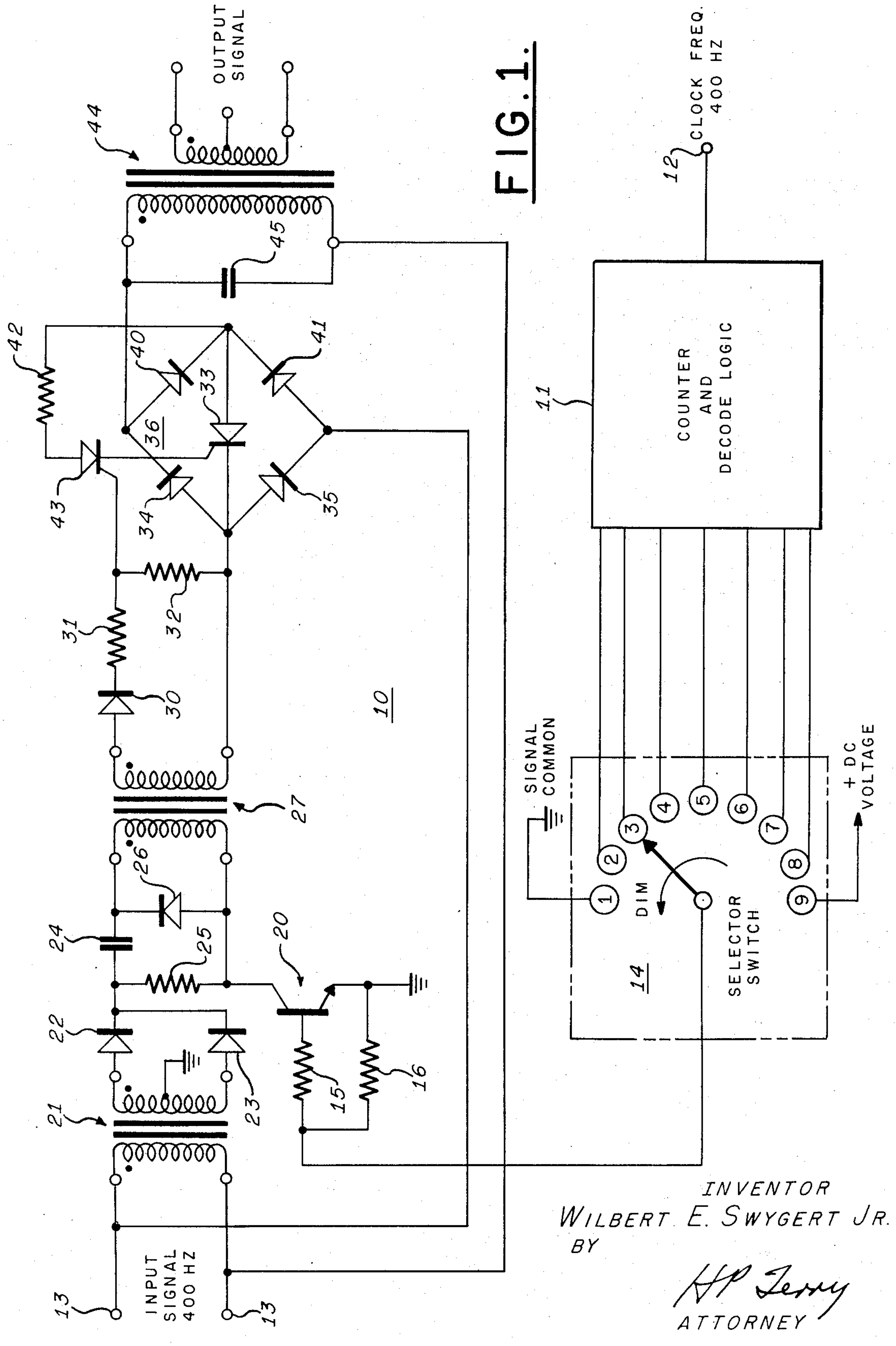
FIG. 1 is a schematic diagram showing a preferred embodiment of the subject invention.

FIG. 1 shows a control circuit 10 which includes a counter and decode logic 11 having a basic clock frequency applied to its input terminal 12. The counter and decode logic 11 may be comprised of digital integrated circuits which provide a plurality of output signals having specified pulse repetition rates and selectable duty cycles which are sub-multiples of the basic clock frequency applied at terminal 12. The counter and decode logic 11 in one embodiment provided the outputs shown in Table I and may readily be configured to provide these desired outputs by those skilled in the art.

TABLE I

| Counter State | Switch Pos. on Selector Switch 14: 1 | 2 | 3 | 4 | 5 | 6 | 7 | 8 | 9 |
|---|---|---|---|---|---|---|---|---|---|
| 7 | 0 | 1 | 1 | 0 | 1 | 1 | 0 | 0 | 1 |
| 6 | 0 | 0 | 0 | 1 | 1 | 0 | 1 | 1 | 1 |
| | 0 | 0 | 0 | 1 | 1 | 0 | 1 | 1 | 1 |
| 4 | 0 | 0 | 0 | 1 | 1 | 0 | 1 | 1 | 1 |
| 3 | 0 | 0 | 1 | 0 | 0 | 1 | 0 | 1 | 1 |

| | | | | | | | | | |
|---|---|---|---|---|---|---|---|---|---|
| 2 | 0 | 0 | 0 | 0 | 0 | 1 | 1 | 1 | 1 |
| 1 | 0 | 0 | 0 | 0 | 0 | 1 | 1 | 1 | 1 |
| 0 | 0 | 0 | 0 | 0 | 0 | 1 | 1 | 1 | 1 |

An alternating input signal is applied to the input terminals 13 of the gate circuit 10. Since the alternating input signal and the basic clock frequency signal must be of the same frequency and phase-locked for purposes of description, the frequency of these signals will be 400 hertz as shown in FIG. 1. Further, the control circuit 10 will be described in this embodiment as applied to a lamp dimming circuit. However, various other applications will be readily apparent to those skilled in the art.

In the lamp dimmer application the minimum convenient frequency would be 50 hertz because lower frequencies may present a noticeable flicker to the eye. The counter and decode logic 11 would therefore provide output pulses having minimum specified repetition rate of 50 pulses per second and a maximum specified repetition rate of 100 pulses per second as another output signal. The duty cycle of each output signal would conveniently be a variable multiple of the duty cycle of the basic clock signal applied at terminal 12, i.e., ⅛, 2/8, ⅜, 4/8, ⅝, 6/8, and ⅞.

The seven output terminals of the counter and decode logic 11 are connected to corresponding switch positions 2 through 8 on a selector switch 14. Switch position 1 which is connected to a signal common corresponds to the off position and switch position 9 which is connected to a plus d.c. voltage corresponds to the full brightness position of the selector switch 14. The wiper arm of the selector switch 14 is connected to the junction of resistors 15 and 16. The resistor 15 has its other terminal connected to the base of a switching transistor 20 and the other terminal of the resistor 16 is connected to the junction of the emitter of the transistor 20 and signal common. The resistors 15 and 16 provide the required load for the digital circuits in the counter and decode logic 11 and the proper bias for the switching transistor 20.

The 400 hertz input signal applied to the input terminals 13 is coupled to the primary of a transformer 21. Diodes 22 and 23 are connected to the secondary of the transformer 21 to form a full-wave rectifying circuit. The junction of the cathodes of the diodes 22 and 23 are connected to the junction of a capacitor 24 and a resistor 25. The other terminal of the resistor 25 is connected to the collector of the switching transistor 20 while the other terminal of the capacitor 24 is connected to the cathode of a diode 26. A coupling transformer 27 has its input terminals connected across the diode 26 and the junction of the resistor 25 and the collector of the transistor 20 is connected to the anode of the diode 26. The capacitor 24 and the resistive impedance of the primary winding of the transformer 27 form a short time constant differentiating circuit. One terminal of the secondary winding of the transformer 27 is connected to the anode of a diode 30 and the cathode of the diode 30 is connected to one terminal on a resistor 31. A resistor 32 has one terminal connected to the second terminal of the resistor 31 and its other terminal connected to the second terminal on the secondary winding of the transformer 27. The junction of the resistor 32 and the second terminal on the secondary of the transformer 27 is connected to the cathode of a first SCR 33 and also to the common junction of the anodes of diodes 34 and 35. The diodes 34 and 35 form one branch of a full wave bridge rectifier 36.

The other branch of the full-wave bridge rectifier 36 is comprised of diodes 40 and 41 which have their cathodes connected together and also connected to the anode of the SCR 33. The anode of the diode 40 is connected to the cathode of the diode 34, and the anode of the diode 41 is connected to the cathode of the diode 35. The common junction of the cathodes on the diodes 40 and 41 is also connected to one terminal on a resistor 42 which has its other terminal connected to the anode of a second SCR 43. The second SCR 43 has its cathode connected to the gate terminal on the first SCR 33 and the gate terminal on SCR 43 is connected to the junction of resistors 31 and 32. The common terminal between the cathode of diode 34 and the anode of diode 40 is connected to one terminal on the primary of an output transformer 44 and the common terminal between the cathode of the diode 35 and the anode of the diode 41 is connected to one of the input terminals 13. The second terminal on the primary winding of the output terminal 44 is connected to the other input terminal 13. The capacitor 45 is coupled across the input terminals of the primary winding on the output transformer 44 to reduce any ringing in the output circuit.

If the output transformer 44 is a stepdown transformer, the output signal provided at the terminals on the secondary of the transformer 44 will be an alternating 400 $H_z$ voltage operating at a lower level than the input voltage at the terminals 13 of the gate circuit 10.

The operation of the gate circuit 10 will be described with respect to various positions of the wiper arm on the selector switch 14. First with the wiper arm at position 1 there will be no control signal coupled from the counter and decode logic 11 to the base circuit of the switching transistor 20. Therefore the switching transistor 20 will remain non-conducting. The input signal applied to the terminals 13 which coupled through the transformer 21 and rectified by the diodes 22 and 23 will not be coupled through the transistorized switching circuit to the primary of the transformer 27. Therefore no trigger pulses will be triggered into the SCRs 43 and 33. Further, the input signal applied to the terminals 13 will have no continuous path of conduction through the primary winding of the output transformer 44 because the SCR 33 in the full wave bridge rectifier 36 will not be conducting. Therefore, the input signal is not coupled to the output transformer 44 and the control circuit 10 will not provide an output signal.

Second, with the wiper arm of the selector switch 14 at position 9, a positive d.c. voltage is coupled through the resistors 15 and 16 to gate on the switching transistor 20. Since this is a constant voltage the switching transistor 20 will remain conducting as long as the wiper arm is at position 9 on the selector switch 14. The 400 $H_z$ input signal applied to the input terminals 13 is coupled from the primary to the secondary of the transformer 21 where it is full wave rectified by the diodes 22 and 23. The rectified alternating signal is applied across resistor 25. The capacitor 24 blocks the d.c. components of the rectified alternating signal from the primary of the transformer 27.

Since the slope of the full-wave rectified alternating signal undergoes a change from a maximum negative to a maximum positive at the zero voltage points (which also correspond to the zero voltage crossing of the 400 $H_z$ input signal) sharp positive-going edges are generated by the short time constant differentiating circuit at these points in time.

The diode 26 across the primary of the transformer 27 provides a clamp circuit which prevents negative input excursions from being coupled into the primary of the transformer 27 and also provides a path for rapidly dissipating stored energy in the transformer magnetic field after the output of the differentiating circuit drops to zero. Therefore the pulses coupled from the primary to the secondary of the transformer 27 are sharper and better defined due to the inclusion of the diode 26. The transformer 27 serves to isolate the signal common of the switching transistor 20 from the input to the full wave diode bridge circuit which is coupled to the primary winding of the output transformer 44. The pulses coupled through the transformer 27 are applied to the anode of the diode 30 which only passes the positive excursions of the pulses from the secondary winding of the transformer 27 thereby eliminating the possibility of reverse breakdown between the gate and cathode terminal of the SCR 43. The positive going triggers are coupled through the diode 30 to the resistors 31 and 32 which form a divider network that provides the required load for the secondary of the transformer 27 as well as the gate to cathode load for the SCR 43. The output triggers from the junction of the resistors 31 and 32 are applied to the gate terminal of the SCR 43 which conducts in response to the applied positive pulses. The SCR 43 has a highly sensitive gate circuit which permits it to be used as a device to trigger a higher rated SCR such as the SCR 33. The SCR 43 requires only a minimum amount of current in order to conduct. When it does, current flows through the resistor 42 and the SCR 43 into the gate terminal of the SCR 33. With the SCR 43 fully conducting, the gate of SCR 33 is driven by a trigger signal which is maintained until the SCR 33 is forced into conduction. The resistor 42 limits the current through the SCR 43 but the SCR 43 must meet the same voltage requirements as the SCR 33. However, its current duty in this application is of a pulse nature and therefore is negligible. When the current reaches the trigger requirements of the SCR 33 it turns on and shunts the main power away from the SCR 43.

With the SCR 33 in the full wave diode bridge circuit 36 conducting, the alternating input signal applied at the input terminals 13 is coupled through the diodes and the SCR 33 into the primary of the output transformer 44. It will be noted that the full wave diode bridge circuit 36 is coupled to the primary of the output transformer 44 so that an alternating output signal and not a recitified alternating output signal is applied to the primary of the transformer 44. Therefore, the output signal across the output terminals 46 of the control circuit 10 is an alternating signal with a frequency of 400 $H_z$ but at a lower voltage level than the input signal at the terminals 13.

If pulsating d.c. operation is required then diodes would be connected to the secondary of the output transformer 44 in a manner similar to the diodes 22 and

23 of the transformer 21 and the center tap of the secondary winding on the output transformer 44 would be brought out as the return line rather than being connected to signal common as shown in transformer 21.

Figure 2:
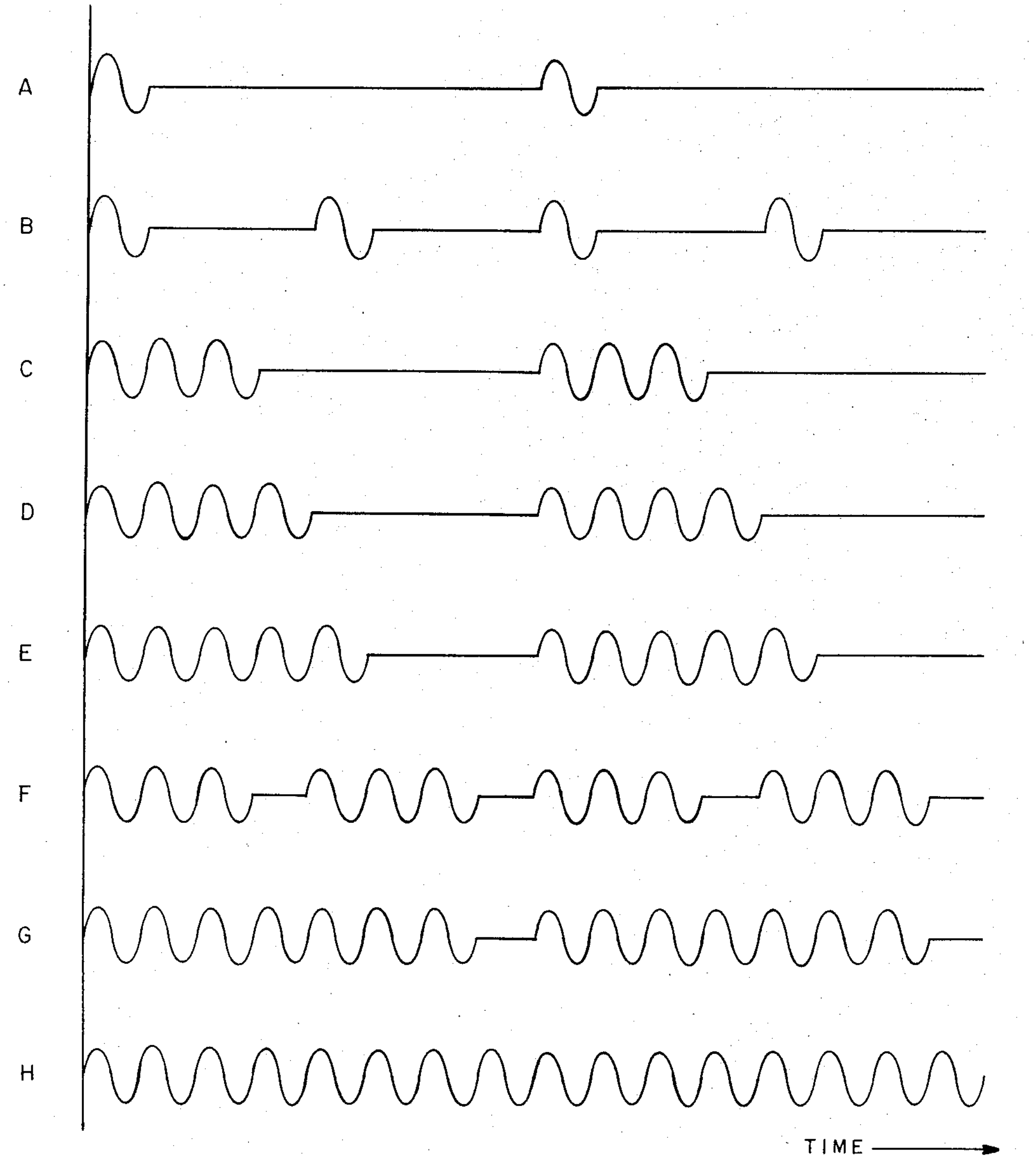
FIG. 2 is a diagram of a plurality of wave forms illustrative of the duty cycle control of the present invention.

If the output signal is to operate at the same voltage level as the input signal then the output transformer 44 and the capacitor 45 would be deleted and the output terminals 46 would be connected to the junction of the diodes 34 and 40 and one of the terminals 13 respectively. For the third variation the wiper arm of the selector switch 14 is in position 2 and the counter and decode logic 11 provides a positive output pulse at a specified pulse repetition rate of 50 pulses per second and a duty cycle which is ⅛th of the duty cycle of the basic clock frequency of 400 $H_z$. The 50 pulses per second signal is coupled from position 2 on the selector switch 14 through resistor 15 to the base of the switching transistor 20. The rectified alternating signal from the junction of the cathodes on the diodes 22 and 23 is applied across the resistor 25. Each positive half cycle of the 50 pulses per second signal causes the switching transistor 20 to conduct for a sufficient amount of time to permit two triggers to be formed from each cycle of the rectified alternating signal applied to the resistor 25. The triggers formed by the short time constant differentiating circuit comprised of the capacitor 24 and resistance in the primary winding of the transformer 27 are coupled to the gate terminal of the SCR 43. Each trigger applied to the terminal of the SCR 43 generates a trigger which is applied to the gate terminal of the SCR 33. Each trigger applied to the SCR 33 allows the SCR 33 to conduct for one-half cycle of the alternating input signal applied to the terminals 13 of the control circuit 10. As each half cycle approaches the zero voltage level there is insufficient voltage to maintain conduction in the SCR 33 and therefore the SCR 33 will cease conduction unless it is retriggered at its gate terminal from the SCR 43. As a result, with the wiper arm of the selector switch 14 at position 2, the first cycle of every 8 cycles of the alternating input signal applied at the input 13 will be coupled to the primary winding of the output transformer 44. This condition is represented by the wave form A shown in FIG. 2. This condition provides the minimal amount of power from the gate circuit 10 and would therefore provide the dimmest illumination available with the embodiment illustrated in FIG. 1. Rotating the switch through positions 3 to 8 would generate the waveforms B through G respectively as shown in FIG. 2.

Since the triggers generated by the differentiating circuit correspond to the zero crossings of the rectified alternating signal derived from the alternating input signal, the switching of the SCR 33 occurs substantially at the zero crossing of the alternating input signal. There is a slight delay due to the switching time of the SCR 43; however, this is negligible due to the relatively high sensitivity of its gate circuit. There is also a delay due to the finite rise time of the zero crossing triggers. This delay, however, can be minimized by providing additional forward gain in the trigger generator circuit. In its application as a light dimmer circuit the additional gain was not required because the electromagnetic interference generated due to the slight delay between the zero crossing of the alternating input signal and the switching of the SCR 33 was well within acceptable limits. Additionally, the use of this type of circuit for dimmer control required only a small amount of front panel space to mount the selector switch 14. This represents a considerable improvement over the use of large variac dimmers which are employed in applications where minimum electromagnetic interference is required.

The eight discrete levels of lamp brightness provided by the gate circuit 10 are considered adequate resolution in most applications for lamp dimmer circuits.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. a variable duty cycle control circuit comprising
   a clock frequency source which produces a basic clock frequency,
   counter and decode logic means coupled to said clock frequency source for providing a plurality of control signals having selectable duty cycles and specified pulse repetition rates less than said basic clock frequency,
   a source of alternating signals having a frequency equal to said basic clock frequency and being phase-locked thereto,
   rectifier means coupled to said source of alternating signals for producing full-wave rectified signals from said alternating signals,
   trigger generator means coupled to said rectifier means and said counter and decode logic means for producing trigger pulses that are coincident with the point of maximum slope of said rectified signals, said trigger pulses having variable repetition rates controlled by said selectable duty cycles of said control signals, and
   transmission gating means coupled to said trigger generator means and said source of alternating signals for producing in response to said trigger pulses, output signals that are reproductions of said alternating signals, said transmission gating means thereby providing output alternating signals having a variable duty cycle.

2. A variable duty cycle control circuit as described in Claim 1 in which said counter and decode logic means provide a plurality of output control signals having selectable duty cycles and specified pulse repetition rates that are sub-multiples of the frequency of said basic clock signal.

3. A variable duty cycle control circuit as described in claim 1 in which said trigger generator means includes a transistorized switch circuit coupled to a short time constant differentiating circuit.

4. A variable duty cycle control circuit as described in claim 3 in which said differentiating circuit includes in combination a capacitor and the resistive impedance of a winding of a coupling transformer in which said combination has a short time constant.

5. A variable duty cycle control circuit as described in claim 1 in which said transmission gate means includes a gate signal amplifier coupled to a full-wave diode bridge circuit for controlling said duty cycle of said alternating output signals.

6. A variable duty cycle control circuit as described in claim 5 in which said gate signal amplifier includes a plurality of SCR's.

7. A variable duty cycle control circuit as described in claim 6 in which a first SCR has a highly sensitive gate circuit.

8. A variable duty cycle control circuit as described in claim 7 in which said gate signal amplifier includes a second SCR coupled to said first SCR for shunting most of the power in said gate signal amplifier away from said first SCR.

9. Method for controlling the duty cycle of an alternating signal comprising the steps of,
   rectifying said alternating signal in a rectifier circuit to produce a pulsating signal,
   counting and decoding a basic clock frequency signal which is synchronous with said alternating signal into a plurality of signals having selectable duty cycles and specified pulse repetition rates which are sub-multiples of said clock frequency,
   controlling a trigger generator responsive to said pulsating signal with said plurality of signals having selectable duty cycles and specified pulse repetition rates to produce triggers having a variable repetition rate and are substantially coincident with the point of maximum slope on said alternating signal and,
   triggering a transmission gate responsive to said alternating signal with said variable repetition rate triggers thereby producing an output signal that is a reproduction of said alternating signal and has a variable duty cycle as determined by the variable repetition rate of said triggers.

10. Method for controlling the duty cycle of an alternating signal as described in claim 9 in which the step comprising controlling a trigger generator further includes the steps of,
   gating a transistorized switch circuit coupled to said rectifier circuit with said plurality of signals having selectable duty cycles and specified pulse repetition rates, and
   differentiating said pulsating signal in a short time constant differentiating circuit to produce variable repetition rate triggers substantially coincident with the point of maximum slope of said alternating signal.

11. In a device for dimming lamps illuminated from an alternating frequency line voltage, a variable duty cycle control circuit comprising,
   a clock frequency signal source in which the clock frequency is equal to and synchronous with said frequency of said line voltage,
   counter and decode logic means coupled to said clock source for producing a plurality of parallel output signals having sequentially decreasing duty cycles which are less than the duty cycle of said clock frequency,
   rectifier means coupled to said source of alternating line voltage for producing a full-wave rectified signal,
   switching means coupled to said counter and decode logic means for selecting one of said plurality of parallel output signals, trigger generator means coupled to said rectifier means and said switching means for producing output trigger pulses having a pulse repetition rate proportional to the duty cycle of said selected output signal and coincident with the point of maximum slope of said alternating line voltage, and transmission gate means coupled to said trigger generator means and said alternating line voltage for producing an alternating output signal that has a variable duty cycle as determined by the duty cycle of said selected output signal thereby providing sequential control in accordance with the duty cycle of said alternating output signal.

12. In a device for dimming lamps as recited in claim 11 in which said duty cycle control circuit includes a basic clock frequency source that provides a 400 $H_z$ clock frequency and said counter and decode logic means produces a plurality of signals having duty cycles equal to ⅛, 2/8, ⅜, 4/8, ⅝, 6/8 and ⅞ of said basic clock frequency source.

* * * * *